US007054854B1

(12) United States Patent
Hattori et al.

(10) Patent No.: US 7,054,854 B1
(45) Date of Patent: May 30, 2006

(54) STRUCTURED DOCUMENT SEARCH METHOD, STRUCTURED DOCUMENT SEARCH APPARATUS AND STRUCTURED DOCUMENT SEARCH SYSTEM

(75) Inventors: Masakazu Hattori, Yokohama (JP);
Katsuhiko Nonomura, Yokohama (JP);
Takuya Kanawa, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 412 days.

(21) Appl. No.: 09/714,627

(22) Filed: Nov. 17, 2000

(30) Foreign Application Priority Data

Nov. 19, 1999 (JP) ............................... 11-330236

(51) Int. Cl.
*G06F 7/00* (2006.01)
*G06F 17/30* (2006.01)
(52) U.S. Cl. ..................... 707/3; 707/100; 707/200
(58) Field of Classification Search .......... 707/1–10, 707/104.1, 100–102, 200, 201; 715/513, 715/515; 709/203
See application file for complete search history.

(56) References Cited

U.S. PATENT DOCUMENTS

| | | | | | |
|---|---|---|---|---|---|
| 5,173,853 | A | * | 12/1992 | Kelly et al. | 715/530 |
| 5,381,523 | A | * | 1/1995 | Hayashi | 715/513 |
| 5,499,331 | A | * | 3/1996 | Hayashi et al. | 715/513 |
| 5,537,593 | A | * | 7/1996 | Diamond et al. | 709/313 |
| 5,557,722 | A | * | 9/1996 | DeRose et al. | 715/513 |
| 5,669,007 | A | * | 9/1997 | Tateishi | 715/517 |
| 5,694,609 | A | * | 12/1997 | Murata | 715/513 |
| 5,873,081 | A | * | 2/1999 | Harel | 707/3 |
| 5,875,441 | A | * | 2/1999 | Nakatsuyama | 707/1 |
| 5,991,751 | A | * | 11/1999 | Rivette et al. | 707/1 |

(Continued)

FOREIGN PATENT DOCUMENTS

| | | |
|---|---|---|
| JP | 6-203078 | 7/1994 |
| JP | 6-301721 | 10/1994 |
| JP | 11-15843 | 1/1999 |

OTHER PUBLICATIONS

Yamada et al., Method, Terminal and Computer Program for Keyword Searching, Jan. 2, 2003.*
McHugh, J. et al., "Query Optimization for XML," VLDB'99, Proc. 25th International Conference on Very Large Data Bases, Sep. 10, 1999, pp. 315-326.
Kubota et al., "A Query Processing Engine of an XML Processing System xQUES," Research Report of Information Processing Society of Japan 99-DBS-119, Jul. 23, 1999, vol. 99, No. 61, pp. 25-30.
Notification of Reasons for Rejection in Japanese Patent Application No. 11-330236.

*Primary Examiner*—Greta Robinson
*Assistant Examiner*—Miranda Le
(74) *Attorney, Agent, or Firm*—Finnegan, Henderson, Farabow, Garrett & Dunner, L.L.P.

(57) ABSTRACT

Upon a search request including a document logical structure, a search graph including the document structure information is generated. A most appropriate search plan is generated by the computation cost simulation, by using index file composed of data creation index and element name occurrence index, and previously prepared plan generation rule, for the generated search graph. Search results satisfying the search request is obtained by executing the search plan generated for the structured document database.

9 Claims, 20 Drawing Sheets

U.S. PATENT DOCUMENTS

| | | |
|---|---|---|
| 6,182,062 B1 * | 1/2001 | Fujisawa et al. ............... 707/3 |
| 6,263,332 B1 * | 7/2001 | Nasr et al. ..................... 707/5 |
| 6,377,946 B1 * | 4/2002 | Okamoto et al. ............. 707/5 |
| 6,496,819 B1 * | 12/2002 | Bello et al. .................... 707/3 |
| 6,496,820 B1 * | 12/2002 | Tada et al. ..................... 707/5 |
| 6,519,597 B1 * | 2/2003 | Cheng et al. ................ 707/10 |
| 6,526,410 B1 * | 2/2003 | Aoyama et al. ............ 707/102 |
| 6,714,928 B1 * | 3/2004 | Calow ........................... 707/4 |

* cited by examiner

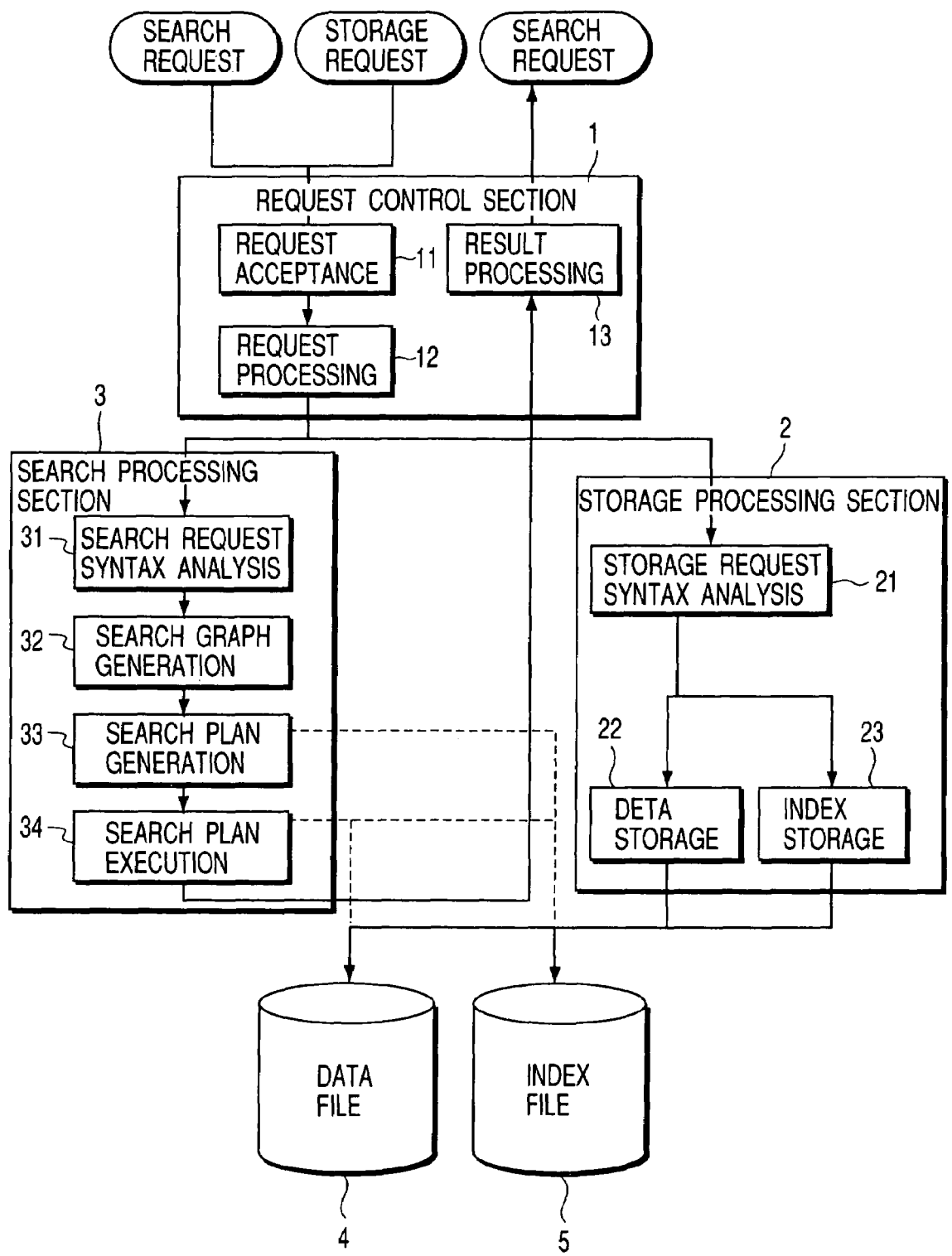
F I G. 1

```
<PATENT>
<NAME>INFORMATION SEARCH APPARATUS</NAME>
<APPLICANT>
<APPLICANT.>T COMPANY</APPLICANT>
<APPLICANTION NO.>PATENT APPLICATION HEI 10-XXXXXX</APPLICATION NO.>
<FILING DATE>
    <YEAR>10</YEAR><MONTH>3</MONTH><DAY>12</DAY>
</FILING DATE>
<ABSTRACT>
TO PROVIDE DATABASE ALLOWING TO CHANGE AS WILL INFORMATION PRESENTATION FORMAT FROM THE
USER'S VIEWPOINT, TO ENLARGE INFORMATION EXPLOITATION RANGE,AND TO PROMOTE INFORMATION
EXPLOITATION.
</ABSTRACT>
<KEY WORD>XML</KEY WORD>
<KEY WORD>SEARCH</KEY WORD>
</PATENT>
```

FIG. 2

```
<CONCEPT NAME= "INFORMATION MODEL" >
  <CONCEPT NAME= "DOCUMENT" >
    <CONCEPT NAME= "STRUCTURED DOCUMENT" >
      <CONCEPT NAME= "XML" />
      <CONCEPT NAME= "SGML" />
    </CONCEPT NAME>
    <CONCEPT NAME= "NON STRUCTURED DOCUMENT" >
      <CONCEPT NAME= "TEXT" />
    </CONCEPT NAME>
  </CONCEPT NAME>
  <CONCEPT NAME= "RELATION" >
    ..............
  </CONCEPT NAME>
  <CONCEPT NAME= "OBJECT" >
    ..............
  </CONCEPT NAME>
</CONCEPT NAME>
```

FIG. 3

```
<CONCEPT NAME= "INFORMATION OPERATION" >
  <CONCEPT NAME= "SEARCH" />
  <CONCEPT NAME= "STORAGE" />
  <CONCEPT NAME= "PROCESSING" />
  <CONCEPT NAME= "DISTRIBUTION" />
</CONCEPT NAME>
```

FIG. 4

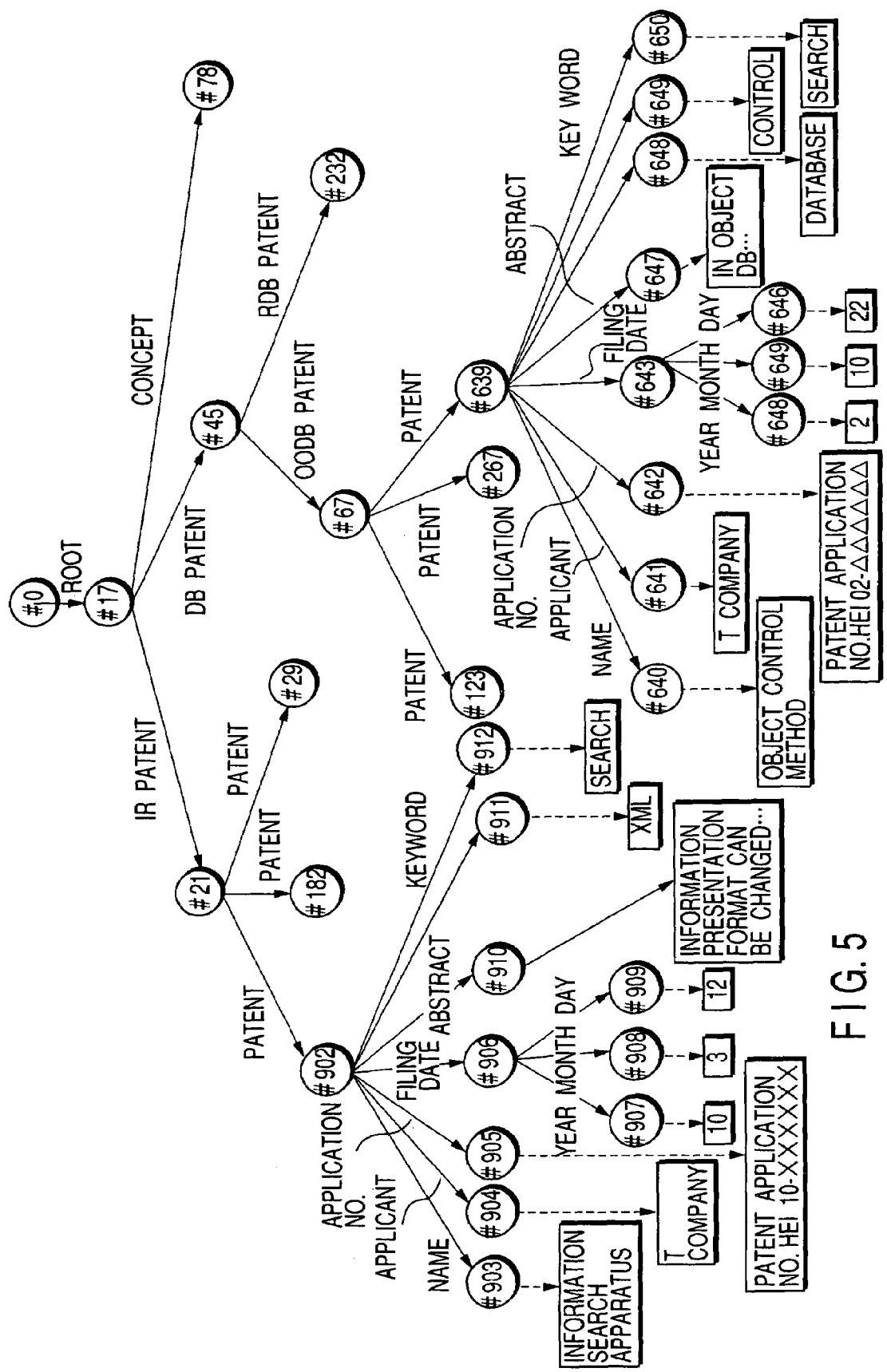
F I G. 5

```
INSERT "ROOT/IR PATENT"
"<PATENT>
    <NAME>NFORMATION SEARCH APPARATUS</NAME>
    <APPLICANT.>T COMPANY</APPLICANT>
    <APPLICANTION NO.>PATENT APPLICATION HEI 10-XXXXXX</APPLICATION NO.>
    <FILING DATE>
        <YEAR>10</YEAR><MONTH>3</MONTH><DAY>12</DAY>
    </FILING DATE>
    <ABSTRACT>
    TO PROVIDE A DATABASE ALLOWING TO CHANGE AS WILL INFORMATION PRESENTATION FORMAT FROM
    THE USER'S VIEWPOINT, TO ENLARGE INFORMATION EXPLOITATION RANGE,AND TO PROMOTE INFORMATION
    EXPLOITATION.
    </ABSTRACT>
    <KEY WORD>XML</KEY WORD>
    <KEY WORD>SEARCH</KEY WORD>
</PATENT>"
```

FIG. 6

```
SELECT
<DOCUMENT>
    <APPLICATION NO.>$x1</APPLICATION NO.>
</DOCUMENT>
WHERE
<*/PATENT>
    <APPLICATION NO.>$x1</APPLICATION NO.>
    <KEY WORD>$x2</KEY WORD>
</PATENT>FROM "ROOT/"
$x2= "SEARCH"
```

FIG. 7

```
SELECT
<DOCUMENT>
    <APPLICATION NO.>$x1</APPLICATION NO.>
</DOCUMENT>
WHERE
<*/PATENT>
    <APPLICATION NO.>$x1</APPLICATION NO.>
    <KEY WORD>$x2</KEY WORD>
</PATENT>FROM "ROOT/"
<CONCEPT NAME= "DOCUMENT" >
    <*/CONCEPT NAME=$x2/>
</CONCEPT NAME>FROM "ROOT/"
```

FIG. 8

```
SELECT
  <DOCUMENT>
    <APPLICATION NO.>$x1</APPLICATION NO.>
    <CLASSIFICATION AXIS= "INFORMATION MODEL" >$x3</>
    <CLASSIFICATION AXIS= "INFORMATION OPERATION" >
      $x4</CLASSIFICATION>
  </DOCUMENT>
WHERE
  <*/PATENT>
    <APPLICATION NO.>$x1</APPLICATION NO.>
    <KEY WORD>$x2</KEY WORD>
  </PATENT>FROM "ROOT/"
  <*/CONCEPT NAME= "INFORMATION MODEL" >
    <CONCEPT NAME=$x3>
      <*/CONCEPT NAME=$x2/>
    </CONCEPT >
  </CONCEPT >FROM "ROOT/"
  <*/CONCEPT NAME= "INFORMATION OPERATION" >
    <CONCEPT NAME=$x4>
      <*/CONCEPT NAME=$x2/>
    </CONCEPT >
  </CONCEPT>FROM "ROOT/"
```

FIG. 9

```
<RESULT>
 <DOCUMENT>
   <APPLICATION NO.>PATENT APPLICATION HEI 10-XXXXXX</APPLICATION NO.
   <CLASSIFICATION AXIS= "INFORMATION MODEL" >DOCUMENT</CLASSIFICATION>
   <CLASSIFICATION AXIS= "INFORMATION OPERATION" >
     SEARCH</CLASSIFICATION>
 </DOCUMENT>
 <DOCUMENT>
   <APPLICATION NO.>PATENT APPLICATION HEI 09-□□□□□□</APPLICATION NO.>
   <CLASSIFICATION AXIS= "INFORMATION MODEL" >RELATION</CLASSIFICATION>
   <CLASSIFICATION AXIS= "INFORMATION OPERATION" >
     STORAGE</CLASSIFICATION>
 </DOCUMENT>
 <DOCUMENT>
   <APPLICATION NO.>PATENT APPLICATION HEI 10-○○○○○○</APPLICATION NO.>
   <CLASSIFICATION AXIS= "INFORMATION MODEL" >RELATION</CLASSIFICATION>
   <CLASSIFICATION AXIS= "INFORMATION OPERATION" >
     SEARCH</CLASSIFICATION>
 </DOCUMENT>
</RESULT>
```

FIG. 10

| NO. | G NODE | COST | IF OP1 | IF OP2 | IF OP3 | OTHERS | THEN OPERATOR |
|---|---|---|---|---|---|---|---|
| 01 | TAG | 1.0 | AND | M | N | | PATHINST |
| 02 | TAG | 0.5 | M | M | N | | PATHEXPAND1 |
| 03 | TAG | 0.2 | N | M | N | ELEMENT NAME CREATION INDEX EXISTS IN OP2 | PATHEXPAND2 |
| 04 | TAG | 0.1 | N | M | N | REVERSE HIERARCHIC INDEX EXISTS IN OP3 | PATHEXPAND3 |
| 05 | TAG | 0.3 | M | M | M | | PATHCHECK |
| 06 | TAG | 0.6 | N | "*" | M | OP2 OF OP1 ADJACENT TAG NODE IS "ROOT" | NOP |
| ... | | | | | | | |
| 11 | VAR | 0.5 | M | M | | | JOIN |
| ... | | | | | | | |
| 21 | VAL | 0.2 | M | N | | | VALUE |
| ... | | | | | | | |
| 31 | CMP | 1.0 | M | N | | | SELECT |
| 32 | CMP | 0.1 | N | M | | DATA INDEX FOR OP2 EXISTS | FIND |
| ... | | | | | | | |
| 41 | AND | | | | | | |
| ... | | | | | | | |

FIG. 16

```
SELECT
    <DUCUMENT>$x</DUCUMENT>
WHERE
    <*/PATENT>
        <NAME>$X</NAME>
    </PATENT>FROM "ROOT/"
    $x LIKE "SEARCH"
```

FIG. 19

| STEP | G NODE | RULE NO. | OPERATOR |
|---|---|---|---|
| STEP1 | CMP | APPLY RULE 32 | FIND |
| STEP2 | TAG | APPLY RULE 03 | PATHEXPAND2 |
| STEP3 | TAG | APPLY RULE 02 | PATHEXPAND1 |
| STEP4 | VAL | APPLY RULE 21 | VALUE |
| STEP5 | VAR | APPLY RULE 11 | JOIN |
| STEP6 | TAG | APPLY RULE 06 | NOP |
| STEP7 | CON | APPLY RULE | CONSTRUCT |

FIG. 21

```
<RESULT>
    <DOCUMENT>INFORMATION SEARCH APPARATUS</DOCUMENT>
    <DOCUMENT>DATA SEARCH METHOD</DOCUMENT>
    <DOCUMENT>METHOD FOR SEARCH PROCESSING
                OPTIMIZATION AND SEARCH METHOD</DOCUMENT>
</RESULT>
```

FIG. 23

| STEP   | G NODE | RULE NO.      | OPERATOR    |
|--------|--------|---------------|-------------|
| STEP 1 | TAG    | APPLY RULE 01 | PATHINST    |
| STEP 2 | TAG    | APPLY RULE 02 | PATHEXPAND1 |
| STEP 3 | TAG    | APPLY RULE 02 | PATHEXPAND1 |
| STEP 4 | TAG    | APPLY RULE 02 | PATHEXPAND1 |
| STEP 5 | VAL    | APPLY RULE 21 | VALUE       |
| STEP 6 | CMP    | APPLY RULE 31 | SELECT      |
| STEP 7 | CON    | APPLY RULE    | CONSTRUCT   |

FIG. 24

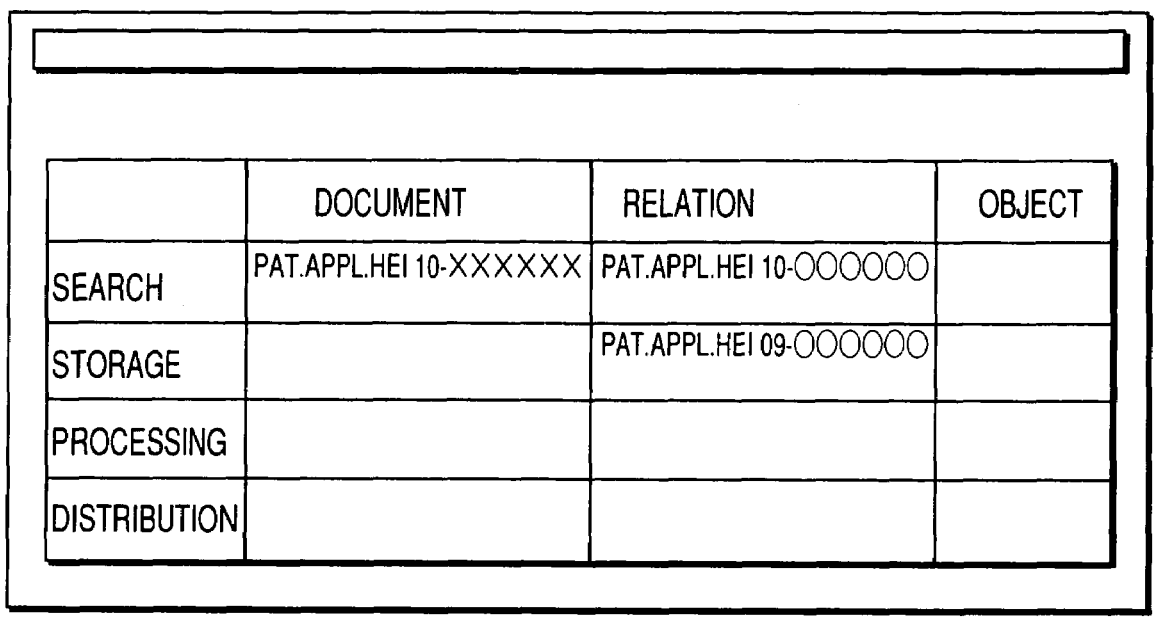
F I G. 26
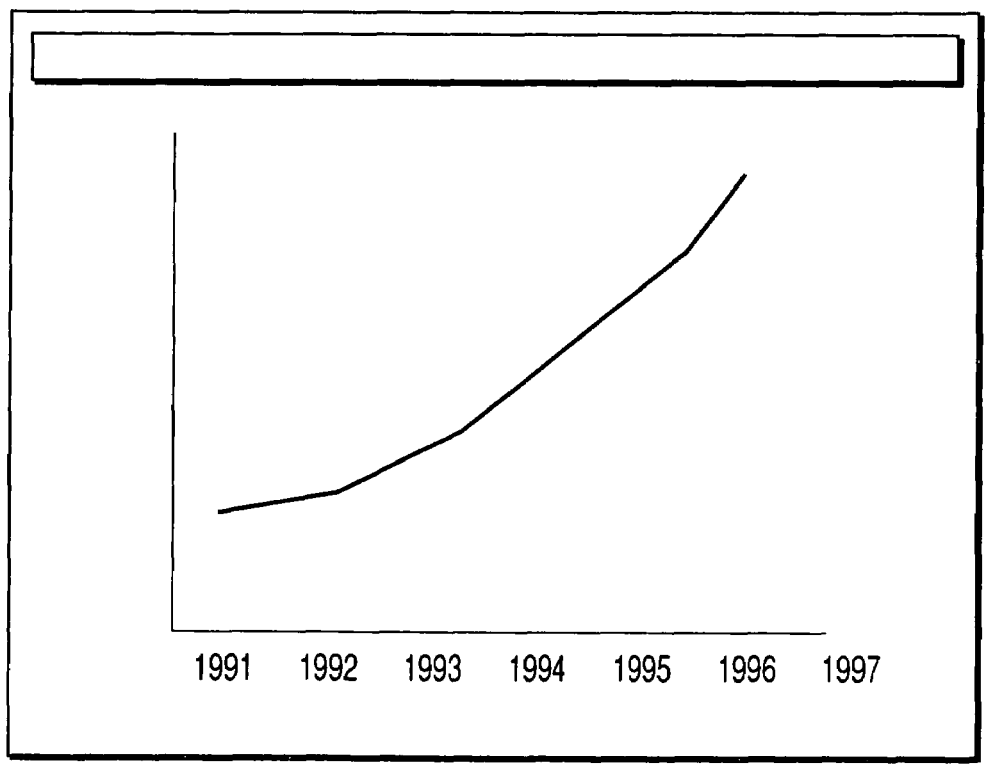
F I G. 27

STRUCTURED DOCUMENT SEARCH METHOD, STRUCTURED DOCUMENT SEARCH APPARATUS AND STRUCTURED DOCUMENT SEARCH SYSTEM

CROSS-REFERENCE TO RELATED APPLICATIONS

This application is based upon and claims the benefit of priority from the prior Japanese Patent Application No. 11-330236, filed Nov. 19, 1999, the entire contents of which are incorporated herein by reference.

BACKGROUND OF THE INVENTION

The present invention relates to a structured document search method for searching based on a search request including a document logical structure, with respect to a structured document database having the logical structure, a structured document search apparatus and a structured document search system.

Keyword designation is one of method for designating a search request with respect to a document database. In this method, when a user requests a search to the document database in a format of keyword string, a group of documents including the keyword string is returned.

Such a simple and primitive search request method is largely applied to the full text search engine or the like; therefore, there is (1) an accuracy problem that a practically unnecessary group of documents is searched, and (2) a granularity problem that the document containing data other the portion to be used is a data unit.

Recently, structured document codes for structured document such as SGML (Standard Generalized Markup Language) or XML (extensible Markup Language) have been proposed, allowing to realize (1) a search more accurate than the conventional keyword search, and (2) a fine search for obtaining data of the portion to be used, through the designation of search request based on the document structure. However, in this case, the document structure should be unified beforehand to a fixed one, and inconveniently, it is impossible to change the document structure afterward, or to change the document structure for each data.

On the other hand, RDB (Relational DataBase) allows to designate a search request based on the table structure by SQL language. "SQL" is a RDB inquiry language standardized in ANSI X3, 1 and ISO/TC97/SC21/WG3 N117 (1987). However, it is difficult to convert a document structure as it is into a table format, and RDB can not be used as it is as a document database.

Further, a method for applying search languages used in OODB (Object Oriented DataBase) for structured document database such as SGML or XML may be devised. As the structured document has a hierarchical structure, it is considered to be highly compatible with OOBD which takes each component as object. Howsoever, in OODB, the document structure should be decided beforehand by the schema, it is difficult to model by object model, such as arbitrary repetition of child element, and an object-oriented database can not be used as it is as document database.

To resolve such inconveniences, for the document repository, it is proposed to equip SQL with a language processing section to which an expanded function appropriate for the structured document is added. The expanded function appropriate for the structured document includes, first, the path specification for specifying a component in a hierarchical structure. Further, functions expanded based on SQL comprise ambiguous path specification including ambiguities such as regular expression in a path for specifying a component in a hierarchical structure, structure pattern for specification for specifying the pattern of a hierarchical structure, or other functions for absorbing the structural fluctuation proper to the structured document.

There are Jpn. Pat. Appln. KOKAI Publication No. 6-203078, Jpn. Pat. Appln. KOKAI Publication No. 6-301721 and Jpn. Pat. Appln. KOKAI Publication No. 11-15843, proposing methods allowing to specify the search request provided with these characteristics, and to process the search.

Jpn. Pat. Appln. KOKAI Publication No. 6-203078 (information search method and apparatus thereof) proposes a method for storing a path assembly wherein the hierarchical structure is fully developed into the RDB as string table. To search for a structured document, a component in the hierarchical structure is specified by issuing SQL for string comparison of a path in the string table with a search statement's ambiguous path. A problem of this method is that the size of the string table fully developing the hierarchical structure becomes huge, when the number of registered document increases.

Jpn. Pat. Appln. KOKAI Publication No. 6-301721 (full text database search method) proposes a method for deciding the component type beforehand, and making that hierarchical structure's parent-child relationship or links to the actual data RDB for each component as structural information. During the structured document search, the search request is converted into SQL statement. A problem of this method is that the computation amount required for a search processing becomes huge, when the number of registered document increases and the depth and width of hierarchy tree increase, because this search processing method begins from the root element, develops from a parent element to a group of child elements and specifies a component in a hierarchical structure. As the development processing is performed by binding RDB, an unimaginable response time is expected for an implementation system. Especially, this trend becomes remarkable, when an ambiguous path is specified.

Jpn. Pat. Appln. KOKAI Publication No. 11-15843 (SGML document search apparatus and SGML document search method) also decides the component type beforehand, and a document table wherein data is string joined for each component type is established. During the structured document search, the search request is converted into SQL statement. A problem of this method is that it can not be specified but the single stage level path, because data is simply string joined for each component type. Another inconvenience is that the document structure should be decided beforehand, and a flexible search request corresponding to the hierarchical structure that a document possesses can not be issued, and the like.

These methods do not limit the computation amount required for the search processing by combining an index for the data and an index concerning the structure conveniently, making the mechanism difficult to adopt the optimization like as RDB.

As described above, in the prior art, it was difficult to meet, at the same time, two requests in trade-off relationship: (1) to specify various searches for the hierarchical structure a document may possess (including ambiguous path), and (2) to restrict the computation amount required for the search processing.

BRIEF SUMMARY OF THE INVENTION

In view of the aforementioned problems, an object of the present invention is to provide a structured document search method allowing to specify various searches for the hierarchical structure including ambiguous paths that a document possesses, without increasing the computation amount required for the search processing, a structured document search apparatus and a structured document search system.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 shows an example of system configuration of a structured document database system according to an embodiment of the present invention;

FIG. 2 shows an example of structured document;

FIG. 3 shows an example of concept information;

FIG. 4 shows an example of concept information;

FIG. 5 shows a conceptual structure example of structured document database;

FIG. 6 shows an example of storage command of a structured document to the structured document database;

FIG. 7 shows an example of search command to the structured document database;

FIG. 8 shows another example of search command to the structured document database;

FIG. 9 shows still another example of search command to the structured document database;

FIG. 10 shows an example of search result of search request processing;

FIG. 16 shows an example of plan generation rules used by the search plan generation section;

FIG. 19 shows still another example of search command to the structured document database;

FIG. 21 shows an example of search plan generated by the search plan generation section;

FIG. 23 shows another example of search result of search request processing;

FIG. 24 shows a search plan in the case of being approached by a conventional technique;

FIG. 26 shows an example of GUI like display of search results through a data display filter program; and FIG. 27 shows another example of GUI like display of search results through a data display filter program.

DETAILED DESCRIPTION OF THE INVENTION

Figure 11:
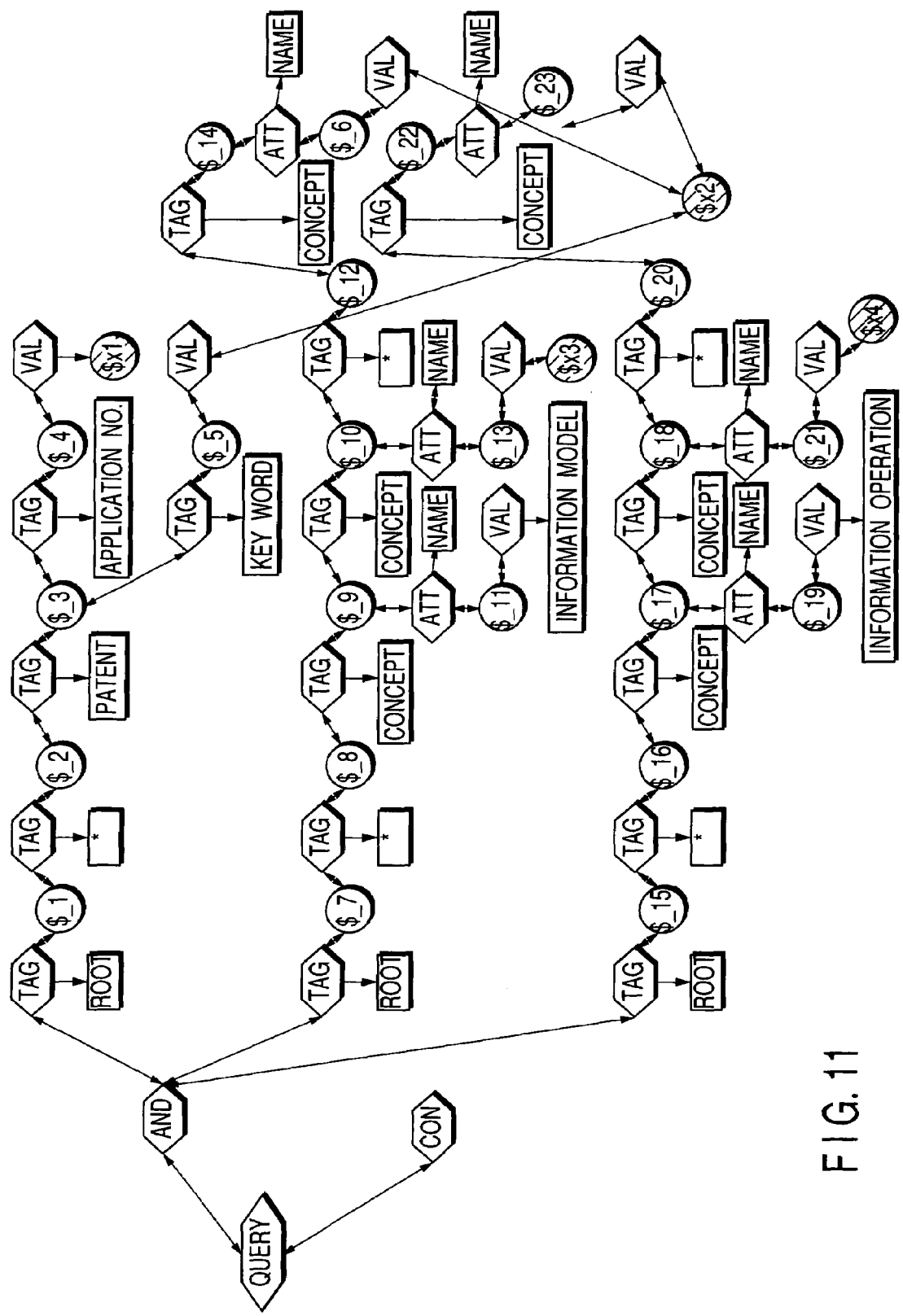
FIG. 11 shows an example of search graph generated by a search graph generation section in response to the search request.

An embodiment of the present invention will be described referring to the accompanying drawings.

Structured documents to which the present invention can be applied include, for example, documents described in SGML (Standard Generalized Markup Language) or XML (extensible Markup Language). SGML is a standard specified by ISO (International Organization for Standardization). XML is a standard specified by W3C (World Wide Web Consortium). They are respectively structured document codes allowing to structure the document.

Tag is used for representing the structure of a document using SGML or XML. Tags includes a start tag and an end tag, and sentence ends in a document and the structural assignment of that document to a component are clarified by surrounding the component of document structure information with start tag and end tag. Here, the start tag is an "element name" closed by symbols "<" and ">", while the end tag is a "element name closed by symbols "<" and "/>". The component contents following the tag are repetition of texts or child components. Besides, the attribute information such as "<element name attribute="attribute value">" can be set in the start tag.

Now, concrete examples shall be described using XML.

As concrete example of database contents, information concerning patent application shall be used and as concrete example of search, information concerning patent application shall be used. Note that the term "patent" in the description using concrete examples shall mean "(those) concerning the patent application".

FIG. 1 shows an example of system configuration of a structured document database system according to an embodiment of the present invention.

This system comprises a request control section 1, a storage processing section 2, a search processing section 3, a data file 4 and an index file 5.

This system configuration can be realized using software. Here, data file 4 and index file 5 are composed, for example, by using external memories.

The request control section 1 is a processing section for processing requests to the structured document database such as search request or storage request from the user, and for delivering the processing to or search processing section 3. Search request or storage request are received as message by the request reception section 11. A request processing section 12 classifies the received message into search request or storage request, and calls the search processing by the search processing section 3 or the storage processing by the storage processing section 2. On the other hand, search results delivered form the search processing section 3 is formatted by a result processing section 13 and returned to the original user.

The search processing section 3 is a processing section for analyzing the search request and generating search results satisfying the search request. A search request syntax analysis section 31 cuts out words and phrases from the search request and extracts the structure of request statement, and a search graph generation section 32 generates search graphs. A search plan generation section 33 generates a search plan from the generated search graphs, and a search plan execution section 34 executes the generated search plan and generates search results satisfying the search request. The search results are delivered to the request control section 1.

The storage processing section 2 is a processing section for analyzing the storage request and storing the structured document. A storage request syntax analysis section 21 cuts out words and phrases from the structured document and extracts the structure of structured document. A data storage section 22 stores structured document data or structure data in the data file 4, and an index storage section 23 stores index of structured document data or structure data in the index file. Index file creation/update may be performed for each input of structured document to be stored or together conveniently (the former is preferable for the search efficiency).

FIG. 2 shows an example of "patent" information as an example of structured document (described in XML).

The "name" information surrounded by "name" tags, "applicant" information surrounded by "applicant" tags, "application No." information surrounded by "application No." tags, "filed date" information surrounded by "filed date" tags, "abstract" information surrounded by "abstract" tags, and "keyword" information surrounded by "keyword" tags are recorded at a position surrounded by "patent" tags (namely, a pair of <patent> and </patent>; the same meaning for elsewhere).

The "filed date" information is further composed "year" information surrounded by "year" tags, "month" information surrounded by "month" tags, and "date" information surrounded by "date" tags. Here, the "filed date" information may comprise further "era" information. Otherwise, the "year" information may be expressed by the Christian Era.

As "keyword" information, a single or a plurality of them can be specified (in the example of FIG. 2, two keywords "XML" and "search" are specified).

As this "keyword" information, structured a document such as XML may contain repetition of arbitrary component, or the document structure is not decided beforehand (can not be defined by schema definition of RDB or OODB).

The "patent" information may contain "publication No." information, "patent No." information, or other various information.

FIG. 3 and FIG. 4 show examples of concept hierarchy used for search as necessary in this embodiment, and expressed by the structured document. Examples of FIG. 3 and FIG. 4 describe the "concept" information in XML.

The example of "concept" information of FIG. 3 represents by hierarchy a "information model" used as a classification axis for classifying the contents of patent document in the course of so-called patent search. The "concept" information surrounded by "concept" tags has a document structure including a nest structure. In other words, in the example of FIG. 3, concept "document", concept "relation", and concept "object" exist as child concept of the concept "information model". In addition, concept "structured document" and concept "non structured document" exist as child concept of the concept "document", and further, concept "XML" and concept "SGML" exist as child concept of the concept "structured document".

The concept hierarchy description example of FIG. 4 represents a classification axis "information operation" different from that in FIG. 3 by concept hierarchy. In the example of FIG. 4, concept "search", concept "storage", concept "processing" and concept "distribution" exist as child concept of the concept "information operation".

FIG. 5 shows a conceptual structure example of structured document database in this embodiment.

The structured document database gathering structured documents specifies to be stored in hierarchy as, for example, UNIX directory structure.

Each node (numbered and indicated by a circle in FIG. 5) of the hierarchy tree of structured document database is called "document node". Hereinafter, the document node shall be called "D node".

The partial hierarchy tree under an arbitrary D node indicates a structured document cut out from the structured document database.

An object ID (described in the circle in FIG. 5) is allocated to each D node. The object ID shall have a unique value in the structured document database.

In the example of FIG. 5, to a document node constituting the rood of hierarchy tree (root D node), an object node ID "#0" that can specify that it is a root D node shall be allocated.

In the example of FIG. 5, the root D node, namely "#0" D node is linked to the "#17" D node having a leading head "root" tag. "#17" D node is linked respectively with "#21" D node having a leading head "IR patent" tag, "#45" D node having a leading head "DB patent" tag, and "#78" D node having a leading head "concept" tag. Here, "IR patent" means that the patent application includes inventions concerning the IR technology in its Specification (it is similar for DB patent, OODB patent, or RDB patent).

The "patent information" illustrated in FIG. 2 corresponds to the partial hierarchy tree under the "#902" D node and, each terminal end D node (#903 to #905, #907 to #912) having the "name" tag or "keyword tag" at the leading head is linked with strings (element value) such as "information search apparatus", "T company", "Patent Application HEI 10-xxxxxx", "10", "3", "12", "the modification of information presentation form is . . . (omitted thereafter)", "XML" or "search".

The partial hierarchy tree under the "#639" D node also corresponds to the "patent" information, however, viewed from the root D node, "#902" D node and "#639" D node are different in the depth of hierarchy depth. Thus, the hierarchy relation form the root D node to the D node corresponding to the "patent" information can be set arbitrarily.

In other words, as shown in FIG. 5, the "patent" information can be generated at any portion of the hierarchy tree such as "#902" D node or "#639" D node. This is the characteristic of the structured document database. Therefore, there generates a search request for searching the "patent" information generated at an arbitrary portion of the hierarchy tree.

As shown in FIG. 5, in this embodiment, "concept" information such as in FIG. 3 and FIG. 4 can also be held in the structured document database (for example, contained in the partial hierarchy tree under the "#78" D node).

FIG. 6 shows an example of storage command of a structured document to the structured document database in this embodiment.

Two variables of storage destination "root/IR patent" and storage data "<patent> . . . (middle omitted) . . . </patent>" exist behind the command name "Insert". This description means that, as storage destination, the storage data "<patent> . . . (middle omitted) . . . </patent>" is inserted into the leading element of the partial hierarchy tree having "IR patent" tag at the leading head, following from the partial hierarchy tree having "root" tag at the leading head. "root/IR patent" is called "document path".

The partial hierarchy tree under the "#902" D node of the conceptual structure shown in FIG. 5 is created as the result of execution of the storage command illustrated in FIG. 6.

The storage request having "Insert" command name is received at the request control section 1 of FIG. 1, submitted to the syntax analysis 21 by the storage processing section 2 and then to the data storage 22 and the index storage 23 mentioned below.

FIG. 7 shows an example of search command to the structured document database.

The example of FIG. 7 represents the search command by a Select statement similar to SQL, and means a search request 'to extract "application No." information about the one having "search" as its "keyword" information, among "patent" information appearing in the structured document database, and output it as "bibliography" information'.

"Where" phrase indicates the condition portion, "From" phrase indicates the document path specification portion, and "Select" phrase indicates the information extraction portion. "$1" and "1$2" are data binding variables.

If the fore of an element name begins with "*" like "<*/patent>", it can match with an arbitrary descendent "patent" of the specified document path. An ambiguous path such as "root/*/patent" corresponds to a 'search request to search for "patent" information generated at an arbitrary portion of the hierarchy tree'.

For instance, in FIG. 5, concerning the "patent" information corresponding to the partial hierarchy tree under the "#902" D node, "search" linked from the "#902" D node satisfies the condition, and the search result will be "Patent Application HEI 10-xxxxxx" linked from the "#905" D node.

FIG. 8 shows another example of search command to the structured document database.

This example means a search request 'to extract "application No." information about the "patent" information having an element value coinciding with the contents belonging to the concept "document" (concept name attribute value (string), in FIG. 3) as its "keyword" information, among "patent" information appearing in the structured document database, and output it as "bibliography" information'.

In this example, the same variable "$x2" is allocated respectively to "keyword" and "name", referring to two kinds of information of, "patent" information and "concept" information. This means the coupling processing of two kinds of information.

For instance, in FIG. 5, if "concept" information is as shown in FIG. 3, as "XLM" linked from the "#911" D node belongs to the concept "document" as shown in FIG. 3, the search results will be "Patent Application HEI 10-xxxxxx" linked from the "#905" D node.

FIG. 9 shows still another example of search command to the structured document database.

This example means 'to extract "application No.", "information model" axis, and "information operation" axis, by setting two classification axis of the classification in the concept "information model" and the classification in the concept "information operation", for "patent" information appearing in the structured document database, and search them as "bibliography" information'.

In this example, the same variable "$x2" is allocated respectively to "keyword" and "name", referring to two kinds of information, "patent" information and "concept" information. This means also the coupling processing of two kinds of information.

A processing to search for "patent" information wherein "keyword" information "$x2" matches with the "concept" information of an arbitrary descendent of the concept "information model" under the document path "root", and to make "$x3" by substituting with one child concept of the concept "information model" is integrated in the portion of extracting "information model" axis. A processing to search for "patent" information wherein "keyword" information "$x2" matches with the "concept" information of an arbitrary descendent of the concept "information operation" under the document path "root", and to make "$x4" by substituting with one child concept of the concept "information operation" is also integrated in the portion of extracting "information operation" axis.

For instance, in FIG. 5, if "concept" information is as shown in FIG. 3 and FIG. 4, as "XLM" linked from the "#911" D node belongs to the concept "document" as shown in FIG. 3 and "search" linked from "#912" D node belongs to the concept "information operation", the search results will be "Patent Application HEI 10-xxxxxx" linked from the "#905" D node, one child concept "document" of the "information model" in FIG. 3, and one child concept "search" of the concept "information operation" as FIG. 4.

FIG. 10 shows an example of search result of the search request processing of FIG. 9. As illustrated in FIG. 10, the search result can also be expressed in XML.

The search request shown in FIG. 9 is received by request control section 1, submitted to a series of processing including syntax analysis (31), search graph generation (32), search plan generation (33), and search plan execution (34) in the search processing section 3 and formatted by the result processing section 13 of the request control section 1, and search results as shown in FIG. 10 will be obtained.

As mentioned before, two classification axis of the classification in the concept "information model" and the classification in the concept "information operation" are set for "patent" information, assembled with "application No." information, and displayed as "bibliography" information list. For example, in the first "bibliography" information, it means that 'the patent of "Patent Application HEI 10-xxxxxx" is classified by "document"×"search"'.

Now, the processing in the search processing section 3 will be described.

Figure 12:
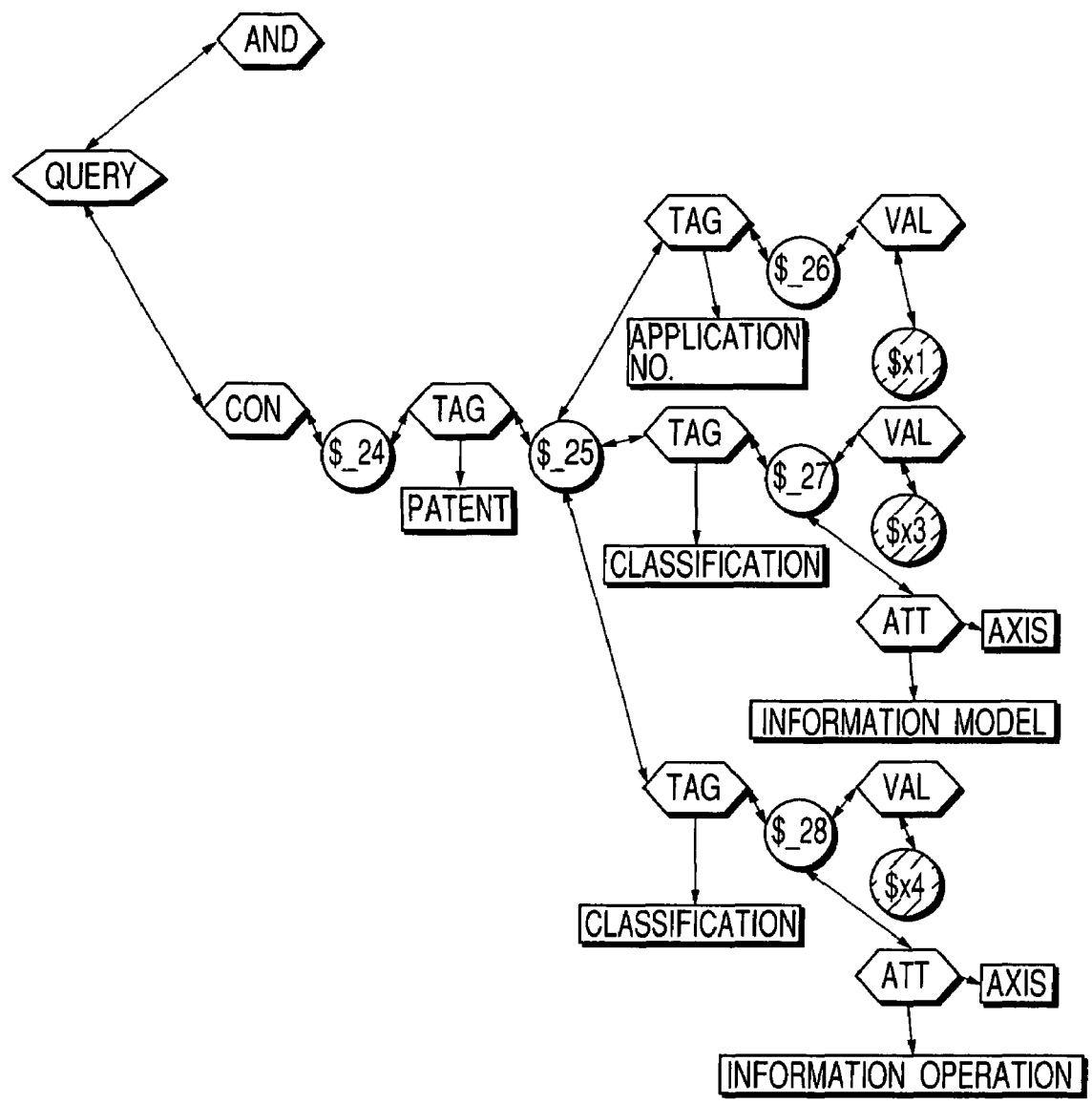
FIG. 12 shows an example of search graph generated by a search graph generation section in response to the search request.

FIG. 11 and FIG. 12 show an example of search graph generated by a search graph generation section 32 in response to the search request of FIG. 9 (for convenience, a part of the same search graph is omitted in FIG. 11 and FIG. 12: "CON" and below of the same search graph is omitted in FIG. 11 and "AND" and below of the same search graph is omitted in FIG. 12).

As shown in FIG. 11 and FIG. 12, the search graph forms a network including a bidirectional link (bidirectional arrows in the drawing) and nodes (circle, rectangular, hexagon in the drawing).

In FIG. 11 and FIG. 12, nodes represented by a rectangular show concrete data (string). Each node other than those represented by a rectangular is called search graph node (G node, hereafter). In other words, G node is composed of 2 kinds of G nodes, one represented by a hexagon and the other represented by a circle.

The G node shown by a circle is the G node representing a variable, and has a string beginning with "$_". G nodes representing a variable can be classified into variables generated inside, and other variables included in Select statement of search request such as "$x1".

G node shown by a hexagon is composed of G node of "QUERY", G node of "AND", G node of "TAG", G node of "ATT(ribute)" or G node of "ALV(ue)".

"Query" G node corresponds to the whole Select statement of search request such as in FIG. 9, "AND" G node corresponds to Where phrase, and "CON" G node corresponds to Select phrase. "AND" G node and subnet groups derived from "AND" G node correspond to compound condition portion to Where phrase and below.

As an example, the condition 'arbitrary "patent" information under the specified document path "root"' is represented by three "TAG" nodes (G node string having "root", "*", "patent"). The variable G node linking two "TAG" G nodes (for instance, "$_1" and "$_2") are variables that can be bound by D node shown in FIG. 5. For example, G node of "$_2" variable, when interpreted from two left "TAG" G nodes, and as it is connected to a right side "TAG" G node, when interpreted together with it, represents an 'arbitrary document below the specified document path "root" and having "patent" tag at the leading head'.

"ATT" G node and "VAL" G node represent a relation between attribute and element data.

Besides, a plurality of links are connected to the G node shown by a hexagon.

"QUERY" G node has op1 link connected to "AND" and op2 link group connected to "TAG".

"AND" G node has op1 link connected to "QUERY" and op2 link group connected to "TAG" group.

"TAG" G node has op1 link (left side) connected to rank higher G node, op2 link (under side) connected to data and op3 link (right side) connected to rank lower G node.

"ATT" G node has op1 link (left side) connected to rank higher G node, op2 link (right side) connected to data and op3 link (under side) connected to rank lower G node.

"CON" G node has op1 link connected to "QEUERY" and op2 link group connecting to "TAG".

"VAL" G node has op1 link (left side) connected to rank higher G node, and op2 link (under side) connected to rank lower G node.

Besides, G nodes representing variable (G node shown by a circle) have link groups connected to the other G node groups.

In the example of FIG. 9, as mentioned before, the same variable "$_2" is allocated respectively to "keyword" and "name" referring to "patent" information and "concept" information. "$_2" variable G node is connected as op link to three "VAL" G nodes and, inversely, is connected as op2 link from three "VAL" G nodes.

Also, G nodes rank lower than "CON" G node corresponding to Select phrase form a network. "patent" information is composed of "application No." information, "classification" information whose "axis" attribute is "information model", and "classification" information whose "axis" attribute is "information operation". The variable value of variable G nodes such as "$x1", "$x3" or "$x4" is decided after Where phrase, which is "AND" node is processed, and they are bound to give results shown in FIG. 10.

Search graphs as shown in FIG. 11 and FIG. 12 can be generated by inputting the description of search request as in FIG. 9, into an existing syntax analysis program generator such as, for example, Yacc (Yet Another Complier—Complier)/Lex(a LEXical analyzer generator).

Now, index files will be described.

Figure 13:
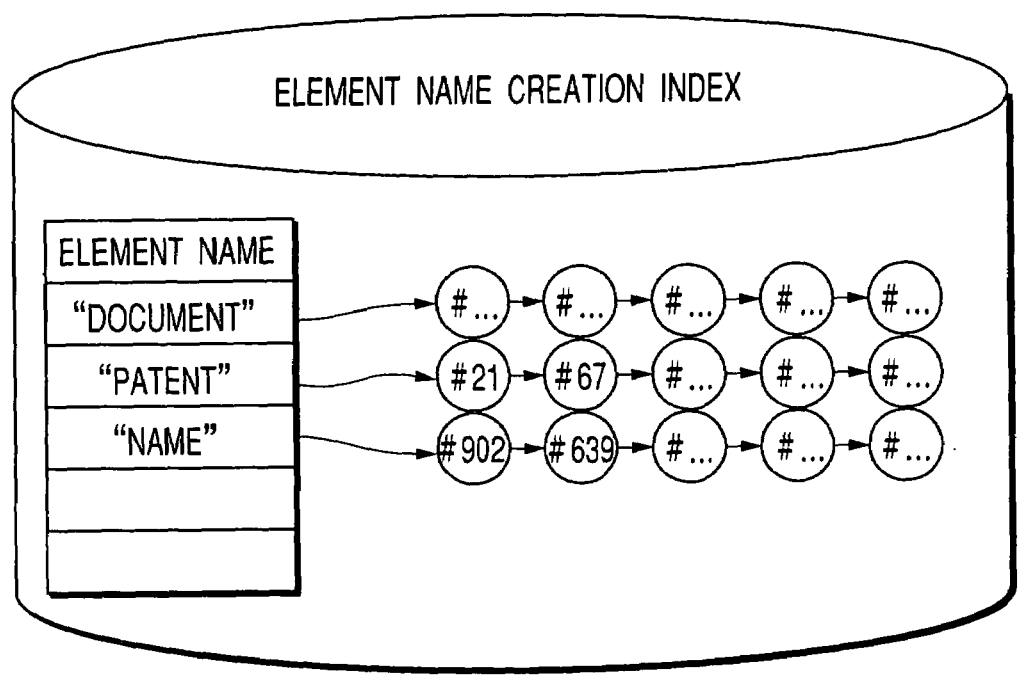
FIG. 13 shows a conceptual structure example of element name occurrence index which is a kind of index file.

FIG. 13 shows a conceptual structure example of, an element name occurrence index which is a kind of index file.

Here, an element name occurrence index means an index file created by associating the element name list stored in the structured document database, and the location of structured document whose element name is generated at the leading head.

For instance, if an element name "patent" (corresponding to "patent" information) is generated in the structured document indicated by D node group "#902", "#639", . . . , as in the structured document database of FIG. 5, when it is indexed, parent D nodes "#21", "#67", . . . of D node group "#902", "#639", are stored in the element name occurrence index file as chain from the "patent" key, as shown in FIG. 13.

When it is thus indexed by the parent D node, the index file size can be compressed. In other words, when it is indexed by the parent D node, the chain size does not increase even if the child D node attempts to increase, because it is replaced by the parent D node. On the contrary, if the actual D node is indexed, the chain size increases in proportion to the increase of the number of stored "patent" documents.

Figure 14:
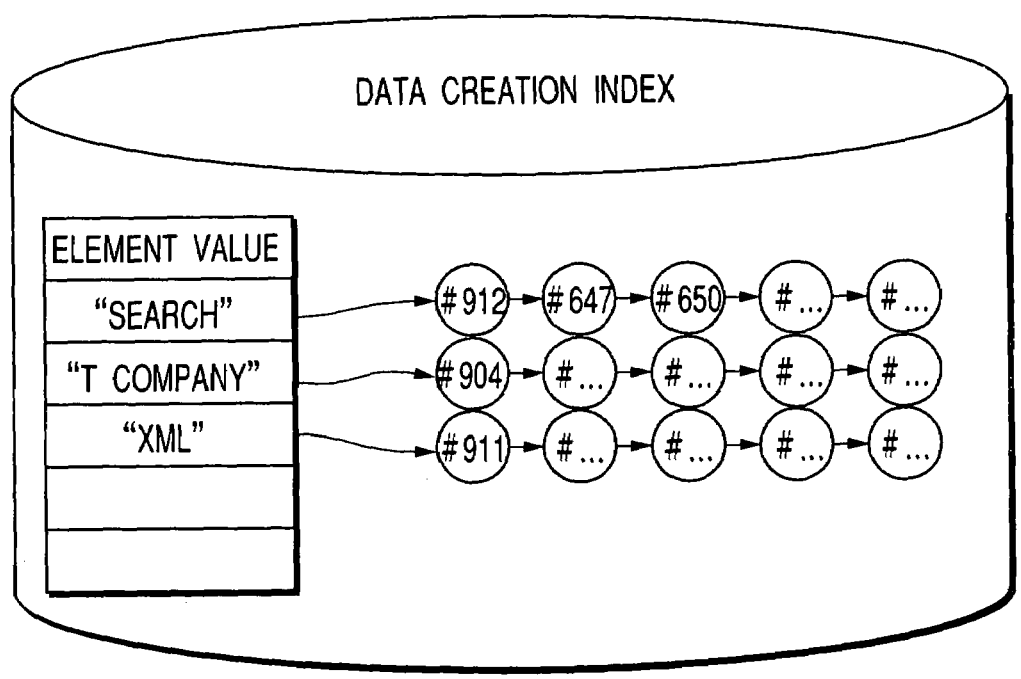
FIG. 14 shows a conceptual structure example of data creation index which is a kind of index file.

FIG. 14 shows a conceptual structure example of data creation index which is a kind of index file.

Here, an data creation index means an index file created by associating the data list stored in the structured document database, and the location of structured document whose data is generated at the leading head.

For instance, if a string data "search" is generated in the structured document indicated by D node group "#912", "#647", "#650", as in the structured document database of FIG. 5 (suppose that a string, "search", is contained in the data linked form D node of "#647"), when it is indexed, D nodes "#912", "#647", "#650" . . . are stored in the data creation index file as chain from the "patent" key, as shown in FIG. 14.

Reverse hierarchical index or other index file may be used. Reverse hierarchical index is one storing the correspondence of a certain node and its parent node (the parent node can be determined from one node).

Now, the search plan generation according to the characteristic point of the present invention will be described.

Figure 15:
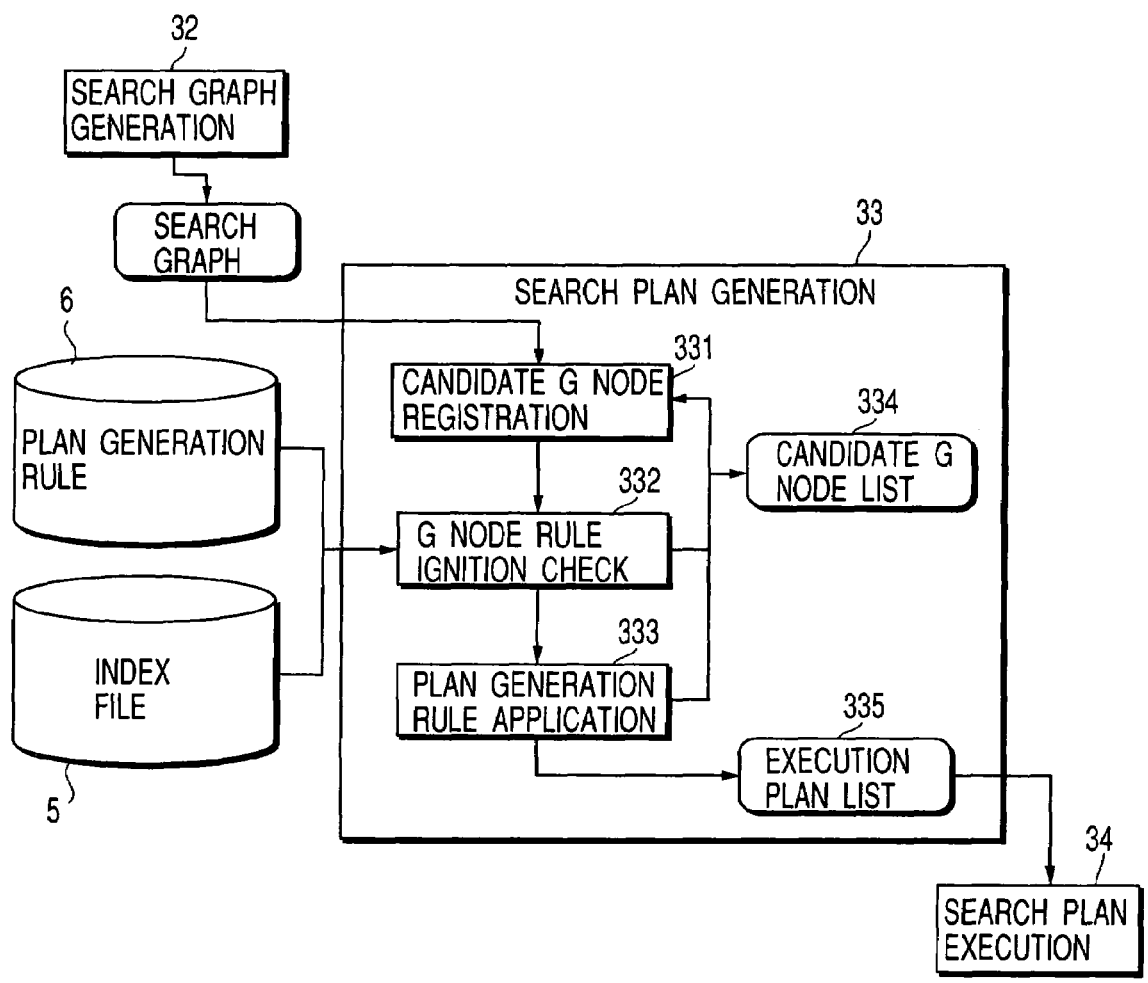
FIG. 15 shows an example of configuration of a search plan generation section.

FIG. 15 is a block diagram showing an example of configuration of the search path generation section 33. The search plan generation section 33 receives input of search graph generated by the search graph generation section 32, generates and outputs an execution plan list based on the plan generation rule.

The plan generation rule 6 shown in FIG. 15, is prepared beforehand, and stored in an external memory or the like, not shown. The detail of the plan generation rule 6 shall be described below.

A candidate G node registration section 331 registers the respective G nodes constituting search graphs as illustrated in FIG. 11 and FIG. 12, in the candidate G node list.

A G node rule ignition check section 332 checks the application of plan generation rule to each G node constituting the candidate G node list.

A plan generation application section 333 extracts a pair of least cost G node and plan generation rule, for each G node to which the plan generation rule can be applied, and executes the plan generation rule. An execution plan as a result of executing the plan generation rule is added to the execution plan list 335.

Further, a group of variable G nodes whose value have chance to be materialized by the plan generation rule is registered in a candidate G node list 334 by the candidate G node registration section 331.

The processing mentioned above is repeated until the candidate G node list 334 becomes empty.

As described above, the plan generation rule is applied to each element of the search graph, by using a plan generation rule base 6, and as the result of application, the plan generation rule is applied again to each element of the affected search graph. A more effective search plan can be realized by going round search graphs in propagation like this.

Also, the generated search plan may be executed after the completion of generation of all search plans. Otherwise, the generation of a single search plan and the execution of that search plan can be executed continuously as a block, and the execution may be repeated (namely, the search plan generation and its execution is repeated alternatively).

Now, the detail of plan generation rule will be described.

FIG. 16 shows an example of plan generation rules used by the search plan generation section. The plan generation rule is, for example, composed in table format. FIG. 16 shows 11 rules.

Each rule includes attributes of rule No, applicable G node class, application cost, application rule (IF) section, and action (THEN) section.

The cost takes for instance a float value equal or less than and equal or more than 1. The magnitude of cost influences extremely the computation cost.

In the application (IF) section, OP1 to 3 represent the aforementioned link. In FIG. 16, "M" means that the variable G node of that link is materialized, and "N" not materialized. "*" is regular expression and means that data to be linked is arbitrary, and "AND" shows that the link destination is "AND" G node. Here, that a variable G node is materialized is defined as 'it is a state wherein values that the variable G node can take are enumerable'.

The portion "Other" in the application (IF) section indicates the other application conditions. For example, "an element name occurrence index exists in OP2" in the rule number "03" supposes, as application rule, that an element name agreeing with the materialized variable value of that OP2 exists in the element name occurrence index.

The operator in the action (THEN) section indicates the action to be executed by the search plan execution section 34 as described in detail below.

In FIG. 16, for example, the rule number "01" indicates that it is applicable to "TAG" G node and the cost is 1.0. Moreover, the application condition is that 'the variable G node of op1 link is "ANS", the variable G node (including data) of op2 link is materialized, and the variable G node of op3 link is not materialized'. Also, it indicates that 'the action is "to generate the execution plan PATHINST"'.

In addition, for example, the rule number "02" indicates that it is applicable to "TAG" G node and the cost is 0.5. Moreover, the application condition is that 'the variable G node of op1 link is materialized, the variable G node (including data) of op2 link is materialized, and the variable G node of op3 link is not materialized'. Also, it indicates that 'the action is "to generate the execution plan PATHEXPAND1"'.

Now, the execution of a search plan generated by the search plan generation section 33 will be described.

Figure 17:
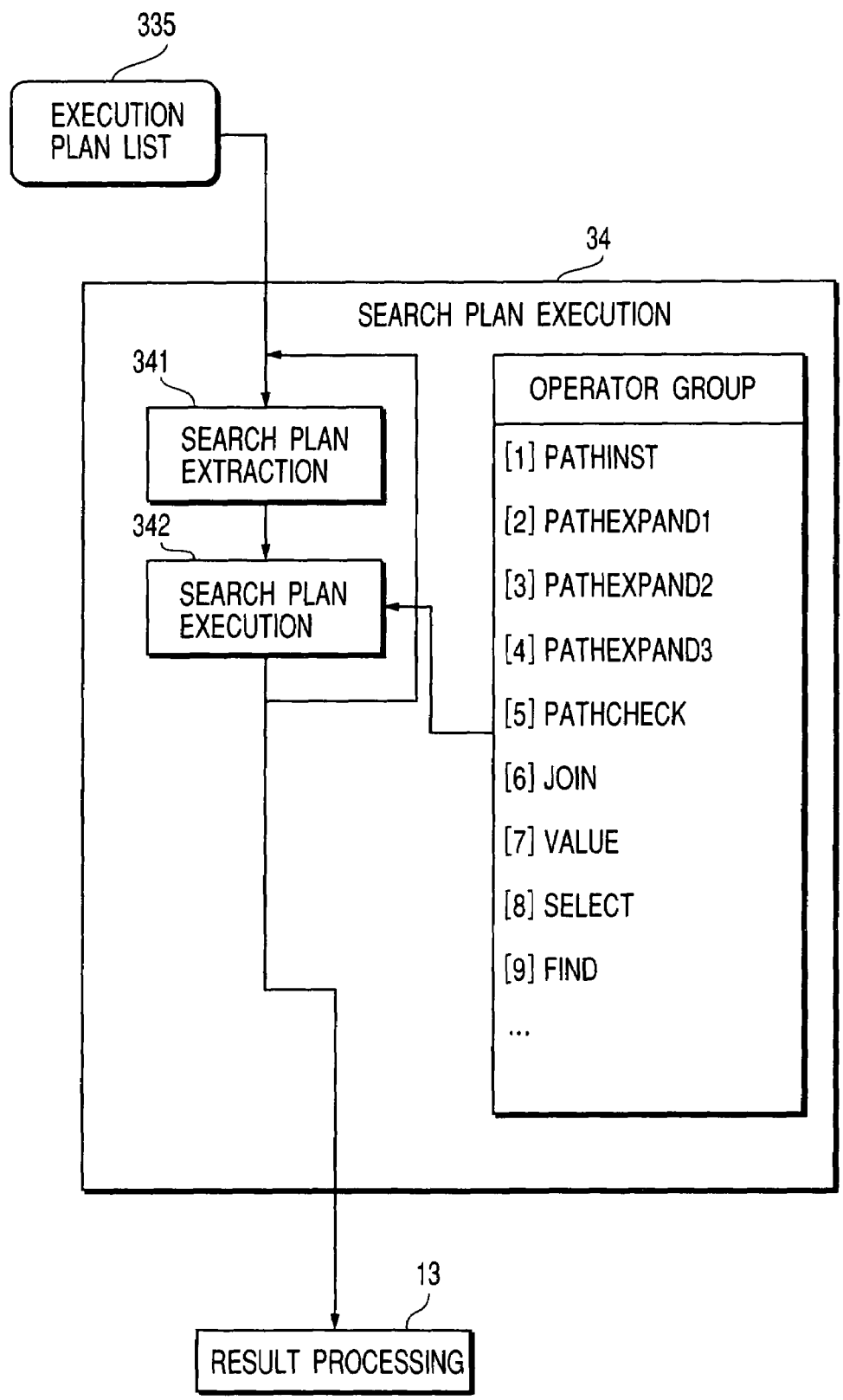
FIG. 17 shows a search plan execution processing procedure.

FIG. 17 shows a search plan execution processing procedure. FIG. 17 shows an example of operator used for the search plan execution section 34.

The search plan execution section 34 extracts (fetches) a item from the input execution plan lists one by one (processing 341), executes the fetched plan (processing 342) and obtains the search result 13 by repeating these two steps of processing.

The details of the operator group applied selectively in the execution of fetched search plan are as follows.

[1] PATHINST: fetch the document path "root".

[2] PATHEXPAND1: obtain D node group matching with the key from rank higher D node group using the specified element name as key.

[3] PATHEXPAND2: obtain parent and child D node group generated in the structured document database, by using the indexed element name as key.

[4] PATHEXPAND3: obtain parent D node from child D node, by using the indexed element name as key.

[5] PATHCHECK: when two D node assemblies are given, obtain a combination of two D nodes in parent-child relationship by the element name specifying them.

[6] JOIN: execute join operation when the materialization progresses from a plurality of G nodes where the variable G node x connects by op link, and are superpose at x.

[7] VALUE: obtain element data candidate of variable G node x.

[8] SELECT: execute comparison operation when element data for variable G node x is selected.

[9] FIND: obtain indexed element data candidate.

Figure 18:
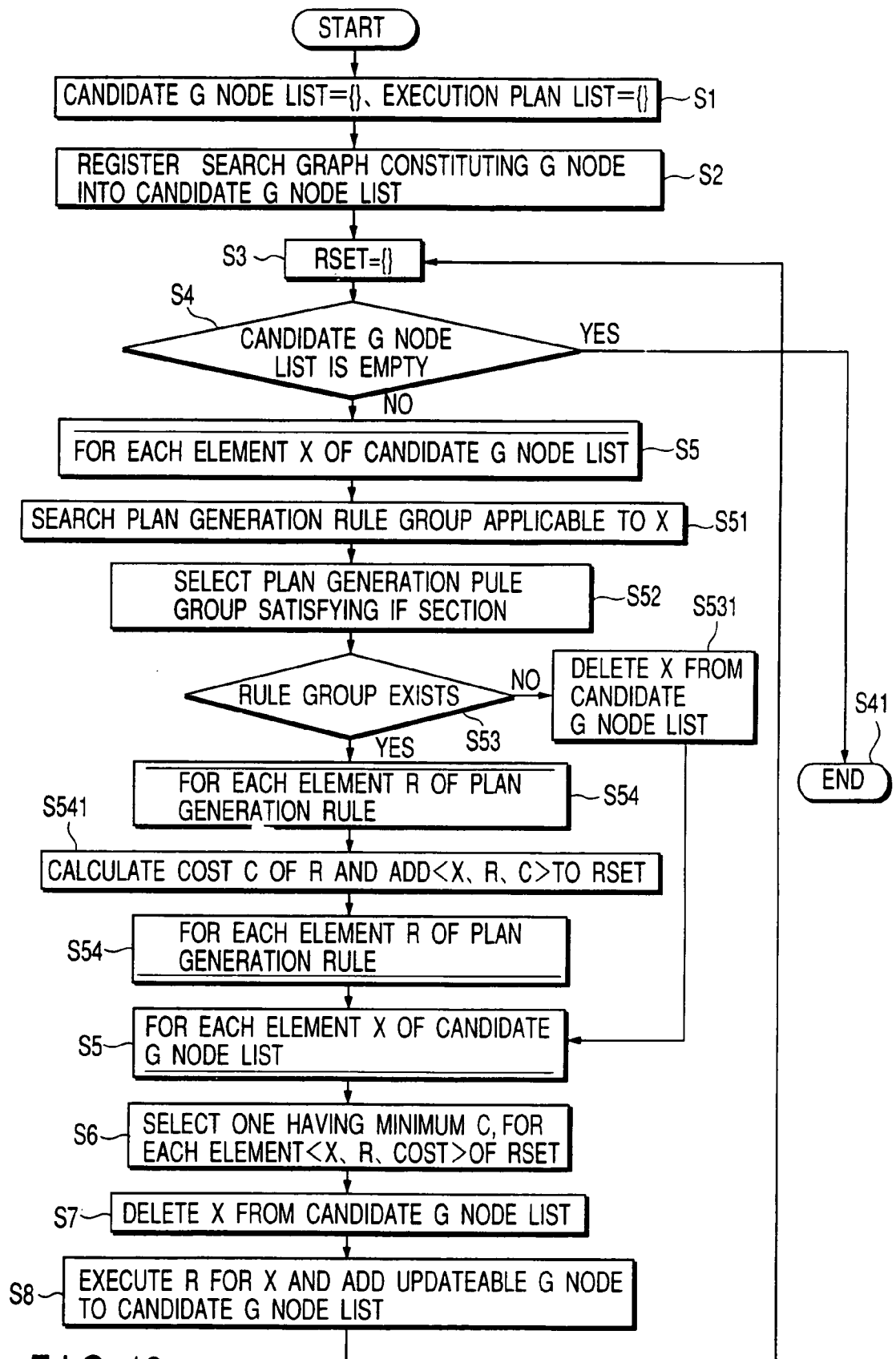
FIG. 18 is a flow chart showing an example of the search plan generation section processing procedure.

FIG. 18 shows an example of the search plan generation section 33 processing procedure.

First, the candidate G node list 334 and the execution plan list 335 are initialized as empty list (step S1).

All of G nodes constituting the search graph are registered in the candidate G node list 334 (step S2).

Intermediate variable rset is initialized as empty list (step S3).

Terminate the search plan generation (step 41) if the candidate G node list 334 is empty (step S4).

If the candidate G node list 334 is not empty (step S4), repeat Step 51 to Step 54 for each component x of not empty candidate G node list 334 (step S5).

Refer to the plan generation rule 6 composed in the aforementioned table format, and search a group of plan generation rules applicable to the component x (step S51).

Select the plan generation rule group satisfying IF section from the searched plan generation rule group (step S52).

If there exist no plan generation rule group (step S53), delete the component x from the candidate G node list 334 (step S531).

If there exists a group (step S53), apply the step S53 to each plan generation rule r (step S54).

In the step S541, cost c of plan generation rule r is calculated, and <x, r, c> is added to rset.

Next, select element <x1, r1, c1> having the minimum cost c for each element <x, r, c> of rset (step S6). Here, the prescribed items are registered in the execution plan list 335.

Delete the component x1 from the candidate G node list 334 (step S7).

Execute the plan generation rule r to the component x1, add updateable G nodes (connected by op1, op2, or the like) to the candidate G node list 334, and return to the step S3 (step S8).

Now, the procedure from search graph generation, to generation and execution of search plan will be described, with concrete examples of search command to the structured document database.

FIG. 19 shows an example of search command, to be used hereafter. This example means to 'extract "name" information and search as "document" information, if rank lower "name" information includes the string "search", for "patent" information appearing in the structured document database'.

Figure 20:
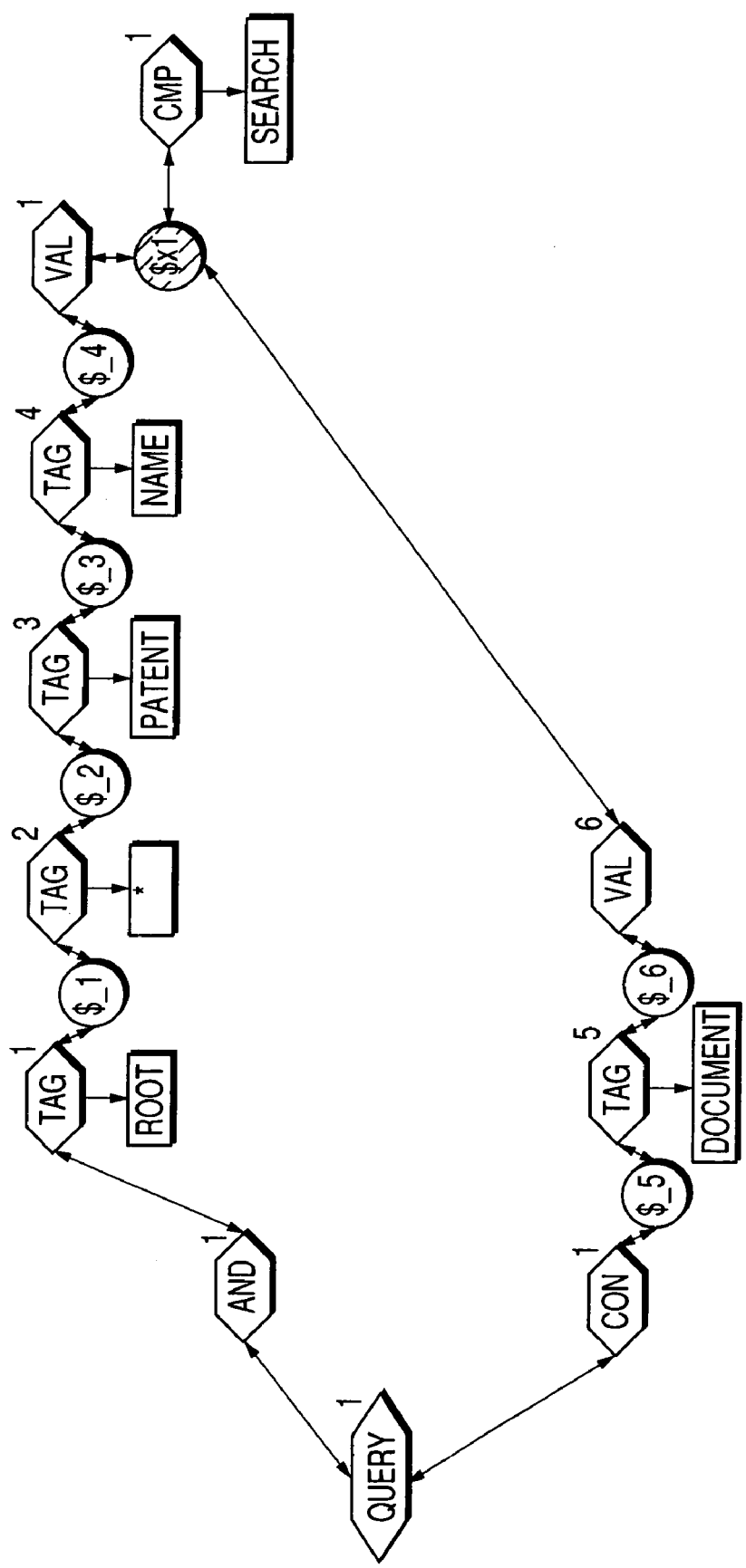
FIG. 20 shows another example of search graph generated by the search graph generation section in response to the search request.

FIG. 20 shows an example of search graph generated by the search graph generation section 33 in response to the search request of FIG. 19.

"$1" variable G node indicates a 'G node variable for D node equal or less the specified document path "root" and rank higher in hierarchy than "$2" variable G node'.

"$2" variable G node indicates a 'G node variable for D node existing rank lower in hierarchy than "$1" variable G node, and beginning with "patent" element name'.

"$3" variable G node indicates a 'G node variable for D node which is a child of a D node beginning with "patent" element name viewed from "$2" variable G node, and beginning with "name" element name'.

"$4" variable G node indicates a 'G node variable for D node which is a child of a D node beginning with "name" element name viewed from "$3" variable G node, and having G node variable "$x1" for D node indication an element data'.

"$x1" variable G node indicates 'G node variable for D node indicating an element data viewed from "$4" variable G node, and including a string "search"'.

Thus, G nodes have a polynomial restriction relation of two terms or more among them and resolve by satisfying the restriction the combination of values that these D node groups can take.

FIG. 21 shows an example of search plan generated by the search plan generation section 33 of this embodiment.

The search plan of FIG. 21 is an example of output results of the search plan generation section 33 when the search request of FIG. 19 is input and the plan generation rule of FIG. 16 is used.

For generating this plan, it is supposed as follows as premise of structured document database.

A key "patent" exists in the element name occurrence index file.

A key "search" exists in the data creation index file.

After all G nodes of the search graph are registered in the candidate G node list 334, a simulation is performed following the flow chart of FIG. 18. The variation of the variable rset can be followed like this, taking one processing from the step S3 to the step S7 as 1 cycle.

(First Cycle)
rset={<TAG01, rule 01,1.0>, <TAG03, rule 03,0.2>, <CMP01, rule 31,1.0>, <CMP01, rule 32, 0.1>}

Here, <CMP01, rule 32, 0.1> is selected, and FIND is output.

G node group to be propagated is {$x1}.
(Second Cycle)
rset={<TAG01, rule 01,1.0>, <TAG03, rule 03,0.2>}

Here, <TAG03, rule 03,0.2> is selected, and PATHEXPAND2 is output.

G node group to be propagated is {$_2, $_3}.
(Third Cycle)
rset={<TAG01, rule 01,1.0>, <TAG04, rule 02,0.5>, <TAG03, rule 06,0.6>}

Here, <TAG04, rule 02,0.5> is selected, and PATHEXPAND1 is output.

G node group to be propagated is {$_4}.
(Fourth Cycle)
rset={<TAG01, rule 01,1.0>, <VAL01, rule 21,0.2>, <TAG02, rule 06,0.6>}

Here, <VAL01, rule 21,0.2> is selected, and VALUE is output.

G node group to be propagated is {$x1}.
(Fifth Cycle)
rset={<TAG01, rule 01,1.0>, <$x1, rule 11, 0.5>, <TAG02, rule 06,0.6>}

Here, <$x1, rule 11, 0.5> is selected, and JOIN is output.

G node group to be propagated is {null}.
(Sixth Cycle)
rset={<TAG01, rule 01,1.0>, <TAG02, rule 06,0.6>}

Here, <TAG02, rule 06,0.63> is selected, and NOP is output.

G node group to be propagated is {null}.
(Seventh Cycle)
rset={<CON01, rule 71,1.0>}

Here, <CON01, rule 71,1.0> is selected, and CONSTRUCT is output. Note that the rule of "CON" is not shown in FIG. 16.

The meaning of this execution plan list 335 is as follows:
(Step 1)
Search a D node group including the string data, "search". As the key "search" exists in the data creation index file, this information is used giving priority.

(Step 2)
Fetch child D node groups having the "patent" element name. As the key "patent" exists in the element name occurrence index file, this information is used giving priority.

(Step 3)
Fetch child D node groups having the "name" element name in the D node groups.

(Step 4)
Fetch child D node groups having element data in the D node groups.

(Step 5)
Take join (JOIN) of the D node groups fetched in the step 1 and D node groups fetched in the step 4.

(Step 6)
Do nothing, because the document path rank higher than "patent" is "root/*".

(Step 7)
Create "bibliography" information using data of the D node groups.

Figure 22:
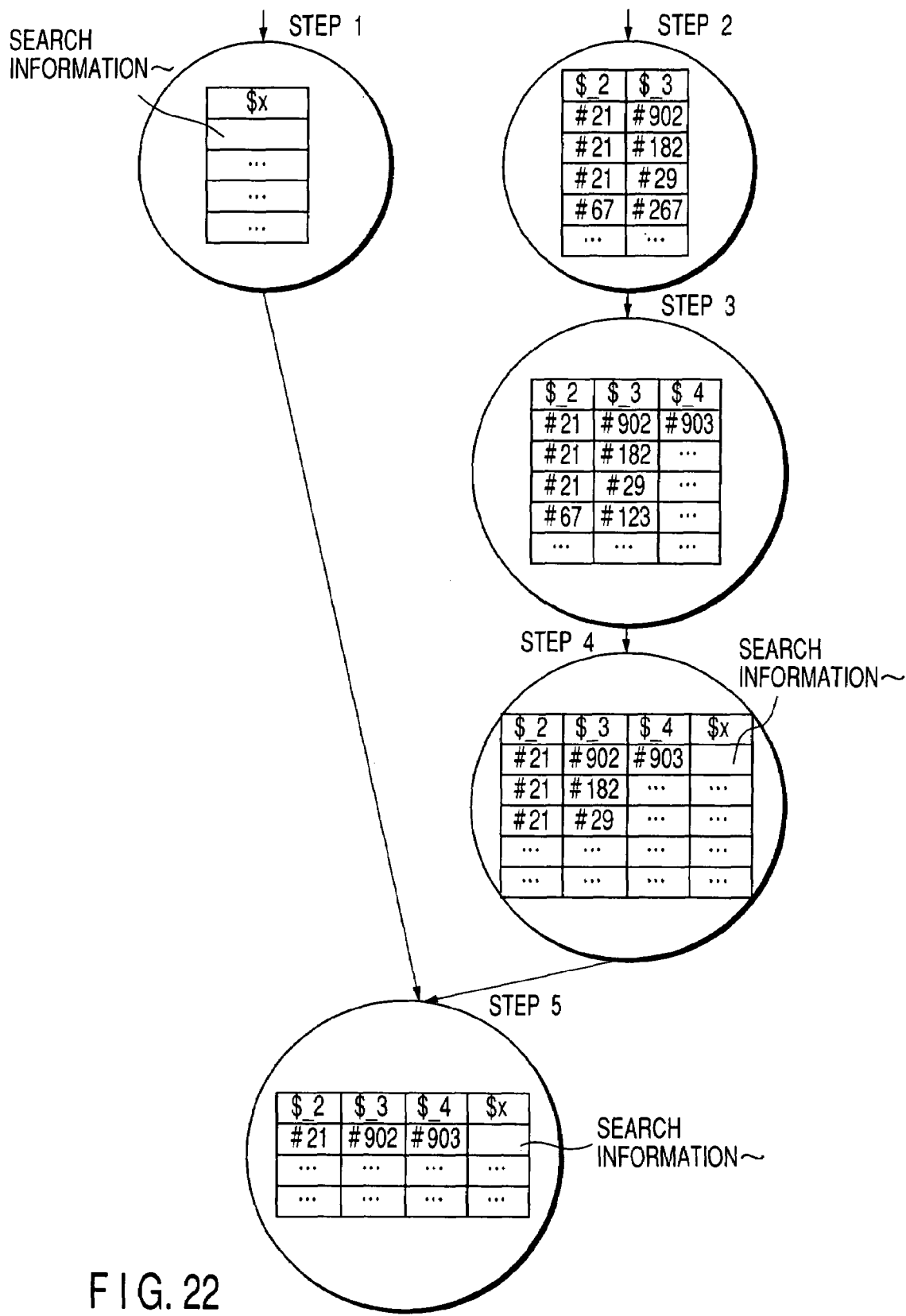
FIG. 22 shows a search plan execution image.

FIG. 22 shows a execution image of the search plan shown in FIG. 21.

In the step 1, as the key "search" exists in the data creation index file of FIG. 14, D node groups can be obtained immediately.

On the other hand, as the key "patent" exists in the element name occurrence index file of FIG. 13, $2 and $3 are materialized immediately. Then, $4 is materialized from FIG. 5 in the step 3. Then, D node groups having element data is fetched in the step 4. In the step 5, join (JOIN) of the D node groups fetched in the step 1 and D node groups fetched in the step 4 is taken.

Thus, it is understood that the search plan is generated effectively using index.

FIG. 23 shows an example of search result of the processing of the search request of FIG. 19.

The search results are also expressed in XML, displayed as a list of "bibliography" information, and include the string "search" such as "information search apparatus".

Here, for comparison, a case approached by a conventional technique shall be explained.

FIG. 24 shows a search plan in the case of being approached by a conventional technique;

This conventional technique is a search processing method beginning from the root element and developing from parent element to child element group, for specifying the structural element on the hierarchical structure.

The meaning of this execution plan list is as follows:
(Step 1)
Fetch a D node group corresponding to root.
(Step 2)
Fetch child D node groups of the D node group.
(Step 3)
Fetch child D node groups having the "patent" element name in the D node groups.
(Step 4)
Fetch child D node groups having the "name" element name in the D node groups.
(Step 5)
Fetch child D node groups having element data in the D node groups.
(Step 6)
Select D node groups whose data includes the string data "search" in the D node groups.
(Step 7)
Create "bibliography" information using data of the D node groups.

Thus, the computation amount required for a search processing becomes huge, when the number of registered document increases and the depth and width of hierarchy tree increase.

Figure 25:
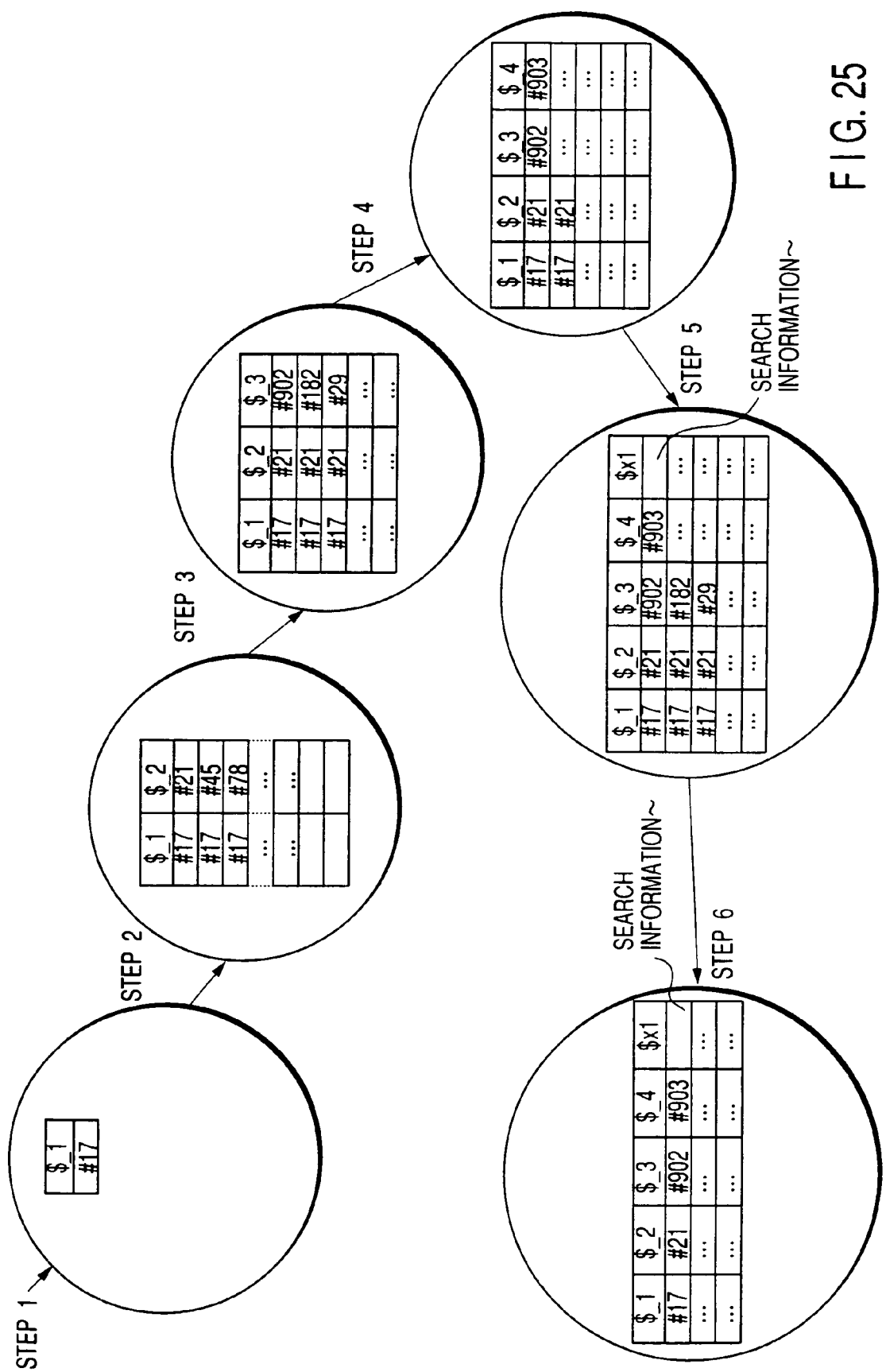
FIG. 25 shows a search plan execution image in the case of being approached by a conventional technique.

FIG. 25 shows a search plan execution image in the case of being approached by the conventional technique shown in FIG. 24.

You can imagine easily that the hierarchy tree development cost becomes huge in the step 2.

Now, an example of GUI (graphical user interface) like display of search results in this embodiment will be described below.

FIG. 26 shows an example of GUI like display of the search results of FIG. 9 shown in FIG. 10 through a data display filter program.

These results are obtained by setting two classification axis of the classification in the concept "information model" and the classification in the concept "information operation" for "patent" information, and searching as "bibliography" information by extracting "application No." and "information model" axis and "information operation" axis, and "application No." information is the data corresponding to the cross point of two axis, by setting "information model" axis as abscissas and "information operation" axis as ordinates.

XML has a display format called style sheet, used for displaying XML document on WWW browser, or printing from the printer. As language for style sheet, XSL (eXtensible Style Language) is prepared as standard code, information as shown in FIG. 26 can be output by using this.

FIG. 27 shows another example of GUI like display of the search results of FIG. 9 shown in FIG. 10 through a data display filter program.

This shows the number of patent application for each year by a line graph, and for this also, information as shown in FIG. 27 can be output by applying the style sheet to XML data, results of processing of the search request to 'sum up the number of patent application for each year'.

Now, a variation of the method to realize the structured document database system of FIG. 1 will be described.

This system can also be realized to receive search request from the other computer through a network such as Internet or LAN, execute the search, and return the search results to the other computer through the network.

In this case, in place of receiving the search request like as FIG. 7 to FIG. 9 from the other computer, the syntax may be analyzed by the other computer for drawing a search graph as FIG. 11/FIG. 12, and this may be received. Otherwise, search request as FIG. 7 to FIG. 9 or search graph as FIG. 11/FIG. 12 may equally be received.

Besides, request control section 1, storage processing section 2 and search processing section 3 may be implemented on a single computer, or separately on two or three computers.

The program realizing respectively request control section 1, storage processing section 2 and search processing section 3 can be received and delivered by a recording media or communication media. In this case, a program realizing all three of request control section 1, storage processing section 2 and search processing section 3 can be stored in a single or a set of recording medium and received and delivered, or a program realizing only a part of request control section 1, storage processing section 2 and search processing section 3 may be stored in a single or a set of recording medium and received and delivered.

Also, for instance, a system including the search processing section 3 and a system including the storage processing section 2, the data file 4 and the index file 5 may be independent systems each other. A system including search processing section 3 can be composed as server, and implemented in respective client.

Obviously, this system can be realized as a single stand alone system.

Also, this embodiment can be realized as a computer readable recoding media recoding programs for executing a prescribed means by a computer (or for making a computer to function as a prescribed means, or for making a computer to realize a prescribed function).

The present invention allows to search by various search specification for the hierarchical structure that a document (including ambiguous path) has, without increasing the computation amount, by generating and executing an optimal search plan by going round appropriately the search graph generated from the search request, by using effectively information concerning structured document database.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A structured document search method for searching a structured document database, comprising:
accepting a search request in the form of a logical structured document;
analyzing the accepted search request to generate a search graph including graph nodes based on the logical structure, wherein the graph nodes represent one of a hierarchical-level relationship, sibling relationship, or ancestor-posterity relationship, and a variable to be embodied is inserted between the graph nodes; and generating a search plan for a hierarchical structure possessed by a searched document, in which a search processing procedure for said structured document database is developed from said search graph, said generating the search plan including:
   (a) applying a plan generation rule to any one of said graph nodes, using a plan generation rule base including a plurality of plan generation rules, the plurality of plan generation rules each including rule application conditions, costs and search processing procedures, the plan generation rule having a cost less than that of applicable plan generation rules of the plurality of plan generation rules and wherein the plan generation rule can be arbitrarily registered or deleted in the plan generation rule base;
   (b) executing a search processing procedure of the applied plan generation rule for materializing said variable; and
   (c) repeating the applying and the executing thereby to complete said search plan; and acquiring search results satisfying said search request by executing said search plan.

2. A structured document search method according to claim 1, further comprising utilizing index information relating to actual data in said structured document database for said materializing.

3. A structured document search method according to claim 1, wherein the search plan is executed after the completion of the generation of said search plan.

4. A structured document search method according to claim 1, wherein generation and execution of said search plan are performed alternately.

5. A structured document search method according to claim 2, wherein said structured document database includes a hierarchical structure concerning element name and element value;
   said search request includes search conditions concerning said element name and said element value; and
   said index information includes at least one of data creation index including information for specifying said element value creation position in said structured document database and element name occurrence index including information for specifying said element name creation position in said structured document database.

6. A structured document search method according to claim 5, wherein said element name occurrence index includes information indicating said element name creation position by a parent element one rank higher in hierarchy of the partial structure where said element name is generated.

7. A structured document search method according to claim 1, wherein said search graph is generated based on the syntax analysis results of the description of said search request, in the generation of said search graph.

8. A structured document search apparatus for searching a structured document database, comprising:
   means for accepting a search request in the form of a logical structured document;
   means for analyzing the accepted search request to generate a search graph including graph nodes based on the logical structure, wherein the graph nodes represent one of a hierarchical-level relationship, sibling relationship, or ancestor-posterity relationship, and a variable to be embodied is inserted between the graph nodes;
   means for generating a search plan for a hierarchical structure possessed by a searched document, in which a search processing procedure for said structured document database is developed from said search graph, said means for generating the search plan including:
   means for applying a plan generation rule to any one of said graph nodes, using a plan generation rule base including a plurality of plan generation rules, the plurality of plan generation rules each including rule application conditions, costs and search processing procedures, the plan generation rule having a cost less than that of applicable plan generation rules of the plurality of plan generation rules and wherein the plan generation rule can be arbitrarily registered or deleted in the plan generation rule base;
   means for executing a search processing procedure of the applied plan generation rule for materializing said variable to complete said search plan; and
   means for acquiring search results satisfying said search request by executing said search plan.

9. A computer program stored in a computer readable medium for searching a structured document database, the program comprising:
   means for instructing a computer to accept a search request in the form of a logical structured document;
   means for instructing the computer to analyze the accepted search request to generate a search graph including graph nodes based on the logical structure, wherein the graph nodes represent one of a hierarchical-level relationship, sibling relationship, or ancestor-posterity relationship, and a variable to be embodied is inserted between the graph nodes;
   means for instructing the computer to generate a search plan for a hierarchical structure possessed by a searched document, in which a search processing procedure for said structured document database is developed from said search graph, said means for instructing the computer to generate the search plan including:
   means for instructing a computer to apply a plan generation rule to any one of said graph nodes, using a plan generation rule base including a plurality of plan generation rules, the plurality of plan generation rules each including rule application conditions, costs and search processing procedures, the plan generation rule having a cost less than that of applicable plan generation rules of the plurality of plan generation rules and wherein the plan generation rule can be arbitrarily registered or deleted in the plan generation rule base;
   means for instructing a computer to execute a search processing procedure of the applied plan generation rule for materializing said variable to complete said search plan; and
   means for acquiring search results satisfying said search request by executing said search plan.

* * * * *